(No Model.) 3 Sheets—Sheet 1.
J. A. KRUISBRINK & J. J. VAN LEEUWEN.
ICE BREAKING AND CLEARING APPARATUS.
No. 499,296. Patented June 13, 1893.
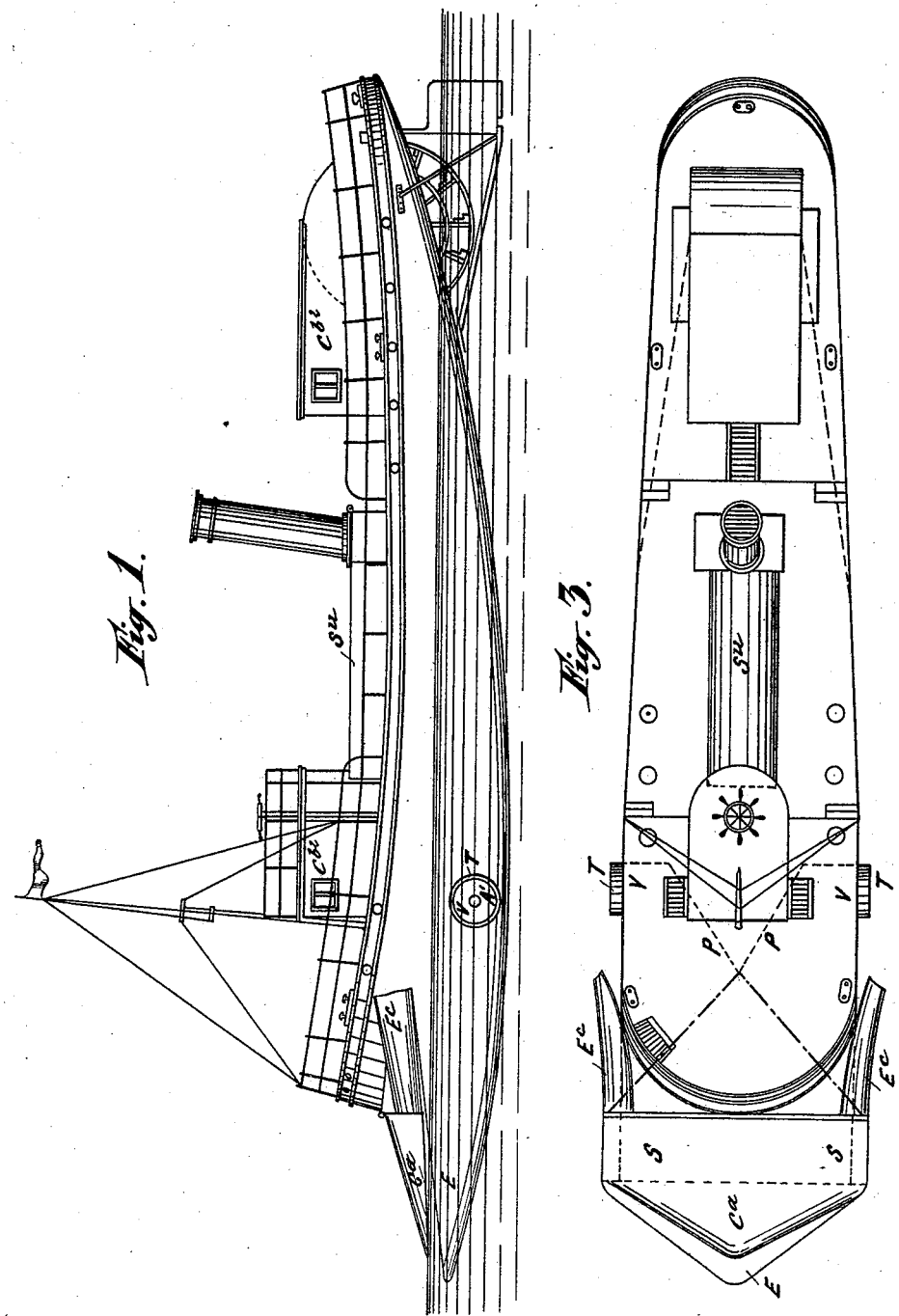

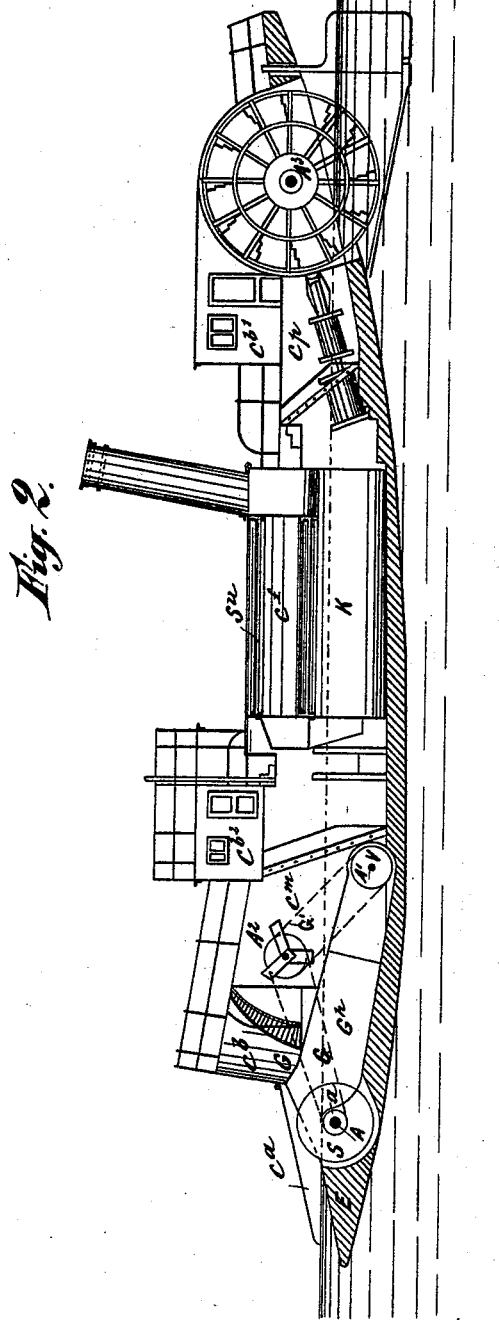

(No Model.) 3 Sheets—Sheet 3.

J. A. KRUISBRINK & J. J. VAN LEEUWEN.
ICE BREAKING AND CLEARING APPARATUS.

No. 499,296. Patented June 13, 1893.

Witnesses
Albert Jones.
John F. Cairns.

Inventors
Johannes A. Kruisbrink, Jacobus J. van Leeuwen
By their attorneys.
Wheatley & Mackenzie

UNITED STATES PATENT OFFICE.

JOHANNES ANTONIUS KRUISBRINK, OF AMSTERDAM, AND JACOBUS JOHANNES VAN LEEUWEN, OF ARNHEM, NETHERLANDS.

ICE BREAKING AND CLEARING APPARATUS.

SPECIFICATION forming part of Letters Patent No. 499,296, dated June 13, 1893.

Application filed November 10, 1891. Serial No. 411,532. (No model.)

*To all whom it may concern:*

Be it known that we, JOHANNES ANTONIUS KRUISBRINK, manufacturer, of Amsterdam, and JACOBUS JOHANNES VAN LEEUWEN, engineer, of Arnhem, Netherlands, subjects of the Queen of Holland, have invented certain new and useful Improvements in Ice Breaking and Clearing Apparatus; and we do hereby declare the following to be a full, clear, and exact description of the invention, such as will enable others skilled in the art to which it appertains to make and use the same.

This invention has for its object the construction of a powerful machine capable of breaking and clearing with ease and rapidity a passage in frozen rivers, harbors, and canals from its ice so as to keep it open for navigation even during the most severe winters; and consists essentially in dividing the ice into parallel strips and in collecting the ice blocks thus formed in a receptacle and in subsequently expelling them and forcing them under the fixed ice at the sides of the clear and regular open passage thus formed. The passage is thus cleared of broken ice and is consequently kept open after each cutting for a much longer time than when the ordinary breakers leaving the broken blocks of ice in the passage are used. The ice is cut into uniform strips or bands by means of saws.

Figure 4:
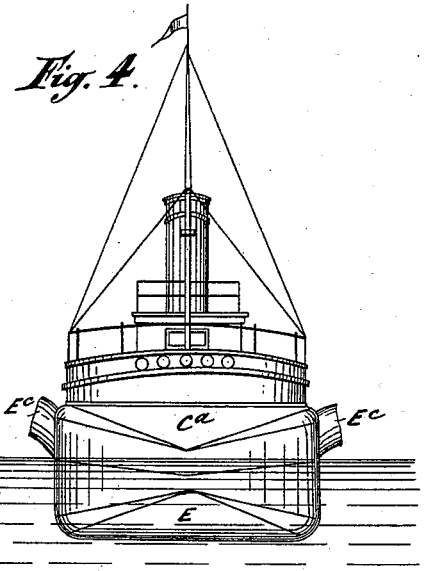
Figure 5:
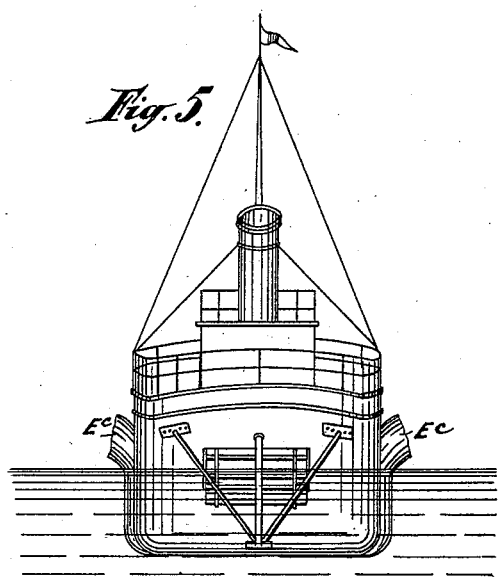
Figure 6:
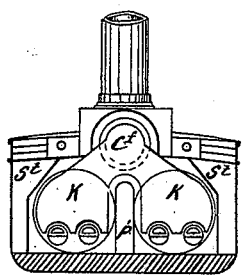
Figure 7:
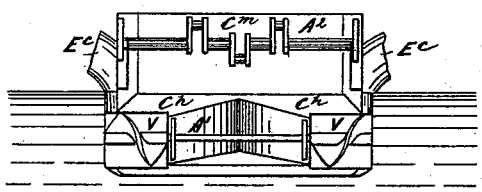
Figure 8:
Figure 9:
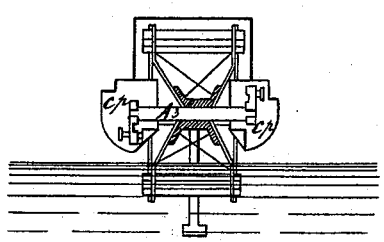

In the accompanying three sheets of illustrated drawings;—Figure 1 is a side elevation of a breaking and clearing apparatus constructed according to this invention, and Fig. 2 is a longitudinal section, Fig. 3 is a plan, Fig. 4 is a front end view, Fig. 5 is a back end view, Fig. 6 is a cross section in front of the boilers, Fig. 7 is a cross section through the clearing apparatus, Fig. 8 is a cross section through the cutting apparatus, Fig. 9 is a cross section through the propellers, of the same.

The whole of the machinery for cutting and clearing away the ice is carried in front of a boat and the propelling mechanism in the rear. The bow is much deeper in the water than the stern; the bottom is flat in a transverse direction and is completely submerged in front and is curved longitudinally so that at the back it is raised completely out of the water. The bottom of the boat terminates in front in a triangular stem E which is always submerged and forms, with a frame $C^a$ pivoted to the bow and covering the stem E above the water line, the front part of a chamber $C^h$ of the same width as the boat and inclining downward toward the rear. A series of equidistant saws S separated by distance rings $a$ is keyed on a shaft A mounted in suitable bearings immediately behind the stem E and serves to divide the ice to be removed into regular strips or bands. The shaft A is in one piece or it may be divided in the center to prevent the saws from jarring on extraneous motions of the boat, and it is sufficiently below the water line to allow the cut ice strips or bands to pass above the distance rings into the chamber $C^h$ where they are broken up or enter in a broken state. The two extreme saws are even with or extend beyond the sides of the boat so as to cut a sufficiently broad passage for the boat. The shaft A is driven from both ends by means of two pitch chains G which gear with chain wheels on a crank shaft $A^2$ and with pinions fixed at the ends of the shaft A between the two extreme saws. The strips of ice cut by these extreme saws ascend with the chains and are intercepted by the guides $E^c$ which project outwardly from the frame $C^a$ and deposit the strips or bands of broken ice upon the fixed ice at the sides of the passage being cut.

Two horizontal Archimedean screws V are mounted in the back part of the chamber $C^h$ on a common shaft $A'$ one on either side of the chamber and extending inward for about a quarter the width of the chamber. The diameter of the screws is equal to the height of the chamber and their shaft is driven by pitch chains $G'$ from the shaft $A^2$. Two guide plates P extending the whole height of the chamber $C^h$ and meeting centrally at an angle guide the cut ice toward the screws V which force the ice laterally through openings T in the side of the boat and under the fixed ice at the sides of the passage being cleared.

The engine driving the cutting and clearing mechanisms is situated in an engine room $C^m$ situated above the chamber $C^h$ and is a triple expansion engine working onto three separate cranks on the shaft $A^2$. In front of the engine room $C^m$ is a small cabin $C^b$ for the workmen. Behind the engine room $C^m$ are the boilers K for supplying the cutting and clearing engine and the propelling engine with steam and which are arranged with a passage P' between them communicating with the engine room $C^m$ and with the engine room $C^p$ at the back of the boilers and containing the propelling engine. Above and between the two boilers is a superheater $S^u$ through which passes the boiler flue $C^f$. The coal bunkers $S^t$ are arranged on both sides of the boilers K and also on the sides of the superheater $S^u$ if required.

The propelling engine is a compound tandem engine, the single piston rods of each high and low pressure cylinder being directly connected to cranks on the propeller shaft $A^3$. The propeller is a paddle wheel placed axially in the rear of the boat, as it can be more readily repaired than a screw.

In front of the paddle box is a cabin $C^{b'}$ for the engineers and in front of this a staircase leading down to the engine room $C^p$. In front of the boilers K is the captain's cabin $C^{b2}$ from which all the operations can be directed and two staircases at the side lead to the engine room $C^m$.

The operation is as follows:—Supposing the passage to be open for the short distance in which the boat floats, the saws S are rotated and the boat propelled, the stem E passing below the ice and the saws being forced into the ice and cutting it into parallel strips which pass over the distance rings $a$ into the chamber $C^h$ and are guided by the guide plates P toward the screws V which force the broken ice below the fixed ice at the sides of the passage being cut and against which it ascends and congeals upon it to form a solid mass with it. The saws are advanced continuously and the passage opened and cleared as the boat advances under the action of the propeller. The hinged frame $C^a$ covers and protects the saws and clears away the snow or other obstacles on the ice. Within the frame is a series of tubes through which the exhaust steam from the engines is passed and escapes finally in front of the saws and prevents them from being covered with ice. When a larger passage is required to be opened than can be obtained by a single traverse of the boat, the boat is traversed over the same course twice and the inclined guide plates are arranged to form a single guide to the screw at that side adjacent to the fixed ice under which the broken ice is forced. This direction of the plates is indicated in interrupted lines in Fig. 3 while the ordinary position is shown in dotted lines.

It will be seen that by means of this apparatus, large water courses can be opened for navigation with comparatively little expense and during the most severe winters and that it is easy to keep the cleared course open by removing from time to time the thin sheet of ice formed since the last clearing.

What we claim as our invention, and desire to secure by Letters Patent, is—

1. Clearing a regular passage for navigation in frozen waters by mechanism consisting of a collecting chamber provided with a forward extension passing under the ice to be removed, of saws mounted on the extension and extending beyond the width of the chamber, and of screws in the collecting chamber for delivering the ice through lateral orifices in the collecting chamber substantially as described.

2. Clearing a passage for navigation in frozen water by mechanism consisting of a collecting chamber provided with a front extension passing under the ice to be removed, of saws mounted on the extension and extending beyond the width of the chamber, of guide plates behind the saws, of lateral orifices in the chamber below the under surface of the unbroken ice, and of screws to which the cut ice is guided by the guide plates and which force the said ice through the lateral orifices and under the unbroken ice at the sides of the passage which is being cut substantially as described.

3. Clearing a passage for navigation in frozen water by mechanism consisting of a floating vessel provided with means for propelling it, of a series of saws mounted on an extension in front of the vessel and under the ice to be cut and operated by an engine on the vessel, of a collecting chamber in the vessel and behind the saws, and provided with guide plates and lateral orifices below the surface of the ice, and of screws to which the cut ice is guided by the guide plates, and which deliver the said ice under the unbroken ice at the side or sides of the track being cut substantially as described.

In testimony whereof we affix our signatures in presence of two witnesses.

JOHANNES ANTONIUS KRUISBRINK.
  JACOBUS JOHANNES VAN LEEUWEN.

Witnesses:
  H. J. REYNDERS,
  A. J. WOCER.